United States Patent
Tamagawa (10) Patent No.: US 12,096,517 B2
(45) Date of Patent: *Sep. 17, 2024

(54) COMMUNICATION SYSTEM AND COMMUNICATION METHOD FOR PROVIDING ACCESS TO IP NETWORK TO WIRELESS TERMINALS

(71) Applicant: SORACOM, INC., Setagaya-ku (JP)

(72) Inventor: Ken Tamagawa, Tokyo (JP)

(73) Assignee: SORACOM, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,620

(22) Filed: Aug. 18, 2023

(65) Prior Publication Data

US 2023/0396981 A1 Dec. 7, 2023

Related U.S. Application Data

(63) Continuation of application No. 17/686,995, filed on Mar. 4, 2022, now Pat. No. 11,765,571, which is a
(Continued)

(30) Foreign Application Priority Data

Jun. 10, 2015 (JP) ................... 2015-117661

(51) Int. Cl.
*H04W 8/18* (2009.01)
*H04L 12/46* (2006.01)
(Continued)

(52) U.S. Cl.
CPC ............ *H04W 8/183* (2013.01); *H04L 12/46* (2013.01); *H04L 12/66* (2013.01); *H04L 45/74* (2013.01);
(Continued)

(58) Field of Classification Search
CPC .. H04W 8/183; H04W 76/12; H04L 61/5007; H04L 45/74; H04L 69/22; H04L 67/10
See application file for complete search history.

(56) References Cited

U.S. PATENT DOCUMENTS

| 6,510,464 B1 | 1/2003 | Grantges |
| 2006/0064750 A1 | 3/2006 | Kersey |

(Continued)

FOREIGN PATENT DOCUMENTS

| EP | 2843885 | | 8/2013 | |
| EP | 2843885 A1 | * | 3/2015 | ............. H04L 12/54 |

(Continued)

OTHER PUBLICATIONS

3GPP TS 23.401 V10.4.0 (Jun. 2011), 3rd Generation Partnership Project; Technical Specification Group Services and System Aspects; General Packet Radio Service (GPRS) enhancements for Evolved Universal Terrestrial Radio Access Network (E-UTRAN) access (Release 10) (Year: 2011).*

(Continued)

*Primary Examiner* — Joseph A Bednash
(74) *Attorney, Agent, or Firm* — Cozen O'Connor (57) ABSTRACT

A communication system for providing an access to an Internet Protocol (IP) network to a wireless terminal, having a gateway to pass data from the wireless terminal to the IP network and having first and second groups of servers, the first group includes a plurality of servers and the second group includes a plurality of servers. The first group is configured to: receive data from the wireless terminal, select a destination address as a selected destination address for the received data, and forward the data to a server of the second group corresponding to the selected destination address. The server of the second group performs data processing of the forwarded data, the data processing including modification of a part of a General Packet Radio Service (GPRS) tun- (Continued)

neling protocol (GTP) payload of the forwarded data, and output the processed data to the IP network.

16 Claims, 9 Drawing Sheets

Related U.S. Application Data continuation of application No. 15/580,962, filed as application No. PCT/JP2016/067291 on Jun. 9, 2016, now Pat. No. 11,310,655.

(51) Int. Cl.
| | | |
|---|---|---|
| H04L 12/66 | (2006.01) | |
| H04L 45/74 | (2022.01) | |
| H04L 61/5007 | (2022.01) | |
| H04L 67/10 | (2022.01) | |
| H04L 69/22 | (2022.01) | |
| H04W 76/12 | (2018.01) | |
| H04W 88/16 | (2009.01) | |

(52) U.S. Cl.
CPC .......... *H04L 61/5007* (2022.05); *H04L 69/22* (2013.01); *H04W 76/12* (2018.02); *H04W 88/16* (2013.01); *H04L 67/10* (2013.01)

(56) References Cited

U.S. PATENT DOCUMENTS

| | | | |
|---|---|---|---|
| 2009/0061934 A1 | 3/2009 | Hauck | |
| 2011/0075744 A1* | 3/2011 | Laselva ............... | H04W 72/10 375/259 |
| 2011/0164511 A1 | 7/2011 | Poon et al. | |
| 2011/0261831 A1 | 10/2011 | Sharma | |
| 2011/0269503 A1 | 11/2011 | Park | |
| 2012/0030280 A1 | 2/2012 | Wang et al. | |
| 2012/0203905 A1 | 8/2012 | Lee | |
| 2012/0309374 A1 | 12/2012 | Tagg | |
| 2013/0054761 A1 | 2/2013 | Kempf et al. | |
| 2013/0142201 A1 | 6/2013 | Kim et al. | |
| 2013/0225130 A1 | 8/2013 | Rost et al. | |
| 2013/0318527 A1 | 11/2013 | Tamura | |
| 2013/0336210 A1* | 12/2013 | Connor ................ | G06Q 30/02 370/328 |
| 2014/0181267 A1 | 6/2014 | Wadkins et al. | |
| 2014/0254373 A1 | 9/2014 | Varma | |
| 2014/0335856 A1 | 11/2014 | Marshall | |
| 2015/0004967 A1 | 1/2015 | Jian | |
| 2015/0109995 A1 | 4/2015 | Mathai et al. | |
| 2015/0135178 A1 | 5/2015 | Fischer et al. | |
| 2015/0381763 A1 | 12/2015 | Moon et al. | |
| 2016/0007188 A1 | 1/2016 | Wane | |
| 2016/0014241 A1* | 1/2016 | Tai ..................... | H04W 28/065 370/474 |
| 2016/0094982 A1 | 3/2016 | Xu | |
| 2016/0269891 A1 | 9/2016 | Chen | |
| 2016/0337896 A1* | 11/2016 | Rajagopalan ....... | H04L 41/0893 |
| 2017/0150435 A1 | 5/2017 | Tagg | |
| 2017/0161120 A1* | 6/2017 | Sasaki ................. | G06F 9/468 |

FOREIGN PATENT DOCUMENTS

| | | |
|---|---|---|
| JP | 2003-50972 | 2/2003 |
| JP | 2013-041397 | 2/2013 |
| JP | 2013-516907 | 5/2013 |
| JP | 2013-126188 | 6/2013 |
| JP | 2013-539623 | 10/2013 |
| JP | 2014-512718 | 5/2014 |
| JP | 2014-155136 | 8/2014 |
| JP | 2014-158190 | 8/2014 |
| JP | 2014-531792 | 11/2014 |
| JP | 2015-505431 | 2/2015 |
| JP | 2015-50537 | 3/2015 |
| JP | 2015-50772 | 3/2015 |
| JP | 2015-100028 | 5/2015 |
| WO | WO 2007/052348 | 5/2007 |
| WO | WO 2012/160465 | 11/2012 |
| WO | WO 2013/144747 | 10/2013 |
| WO | WO 2014/136864 | 9/2014 |
| WO | WO 2014/146999 | 9/2014 |

OTHER PUBLICATIONS

Docomo M2M Platform Docomo Business Online NTT Docomo, NTT Docomo Inc., Mar. 21, 2015 with English translation http://web.archive.org/web/20150321074721/http://www.docomo.biz/html/m2m/solution/m2mplatform/.
White Paper, Next Generation Intel® Xeon® Processors, Networking and Telecommunication Industries, "Developing a Wireless Communications Cloud with Intel® Architecture", pp. 1-6, www.intel.com/go/commsinfrastructure.
First Office Action issued May 22, 2020 in Chinese Patent Application No. 201680033845.8.
Notice of Reasons for Rejection issued Jun. 15, 2020 in Japanese Patent Application No. 2017-028558.
First Examination Report issued Dec. 17, 2019 in European Patent Application No. 16807579.4.
Second Examination Report issued Aug. 12, 2020 in European Patent Application No. 16807579.4.
Extended European Search Report issued Oct. 23, 2018 in European Patent Application No. 16807579.4.
Response to Second Examination Report issued Aug. 12, 2020 in European Patent Application No. 16807579.4 filed Sep. 11, 2020.
Intention to Grant issued Oct. 29, 2020 in European Patent Application No. 16807579.4.
What Is a Public Cloud? I Public vs. Private Cloud, https://www.cloudflare.com/learning/cloud/what-is-a-public--cloud.
What is the difference between public and private IP address?, https://www.iplocation.net/public-vs-private-ip-address.
Search Report dated Oct. 15, 2018 issued in European Patent Application No. 16807579.
Technical Specification, 3GPP TS 29.281 V14.0.0.0 (Mar. 2017).

* cited by examiner

PRIOR ART

COMMUNICATION SYSTEM AND COMMUNICATION METHOD FOR PROVIDING ACCESS TO IP NETWORK TO WIRELESS TERMINALS

RELATED APPLICATIONS

This application is a continuation of U.S. patent application Ser. No. 17/686,995 filed Mar. 4, 2022, which is a continuation of U.S. patent application Ser. No. 15/580,962 filed Dec. 8, 2017, which is a U.S. National Stage of International Application No. PCT/JP2016/067291 filed Jun. 9, 2016, which claims priority of Japanese application no. 2015-117661 filed Jun. 10, 2015, the entire content of all of which are hereby incorporated by reference.

FIELD OF THE INVENTION

The present invention relates to a communication system and a communication method for providing access to an IP network to a wireless terminal.

BACKGROUND ART

In recent years, retail sales of wireless communication lines have been growing with the emergence of mobile virtual network operators (MVNOs). Conventionally, mobile network operators (MNOs) having a wireless communication infrastructure have directly provided wireless communication services to end users. An MVNO provides a unique wireless communication service to an end user, using the wireless communication infrastructure of an MNO.

Figure 1:
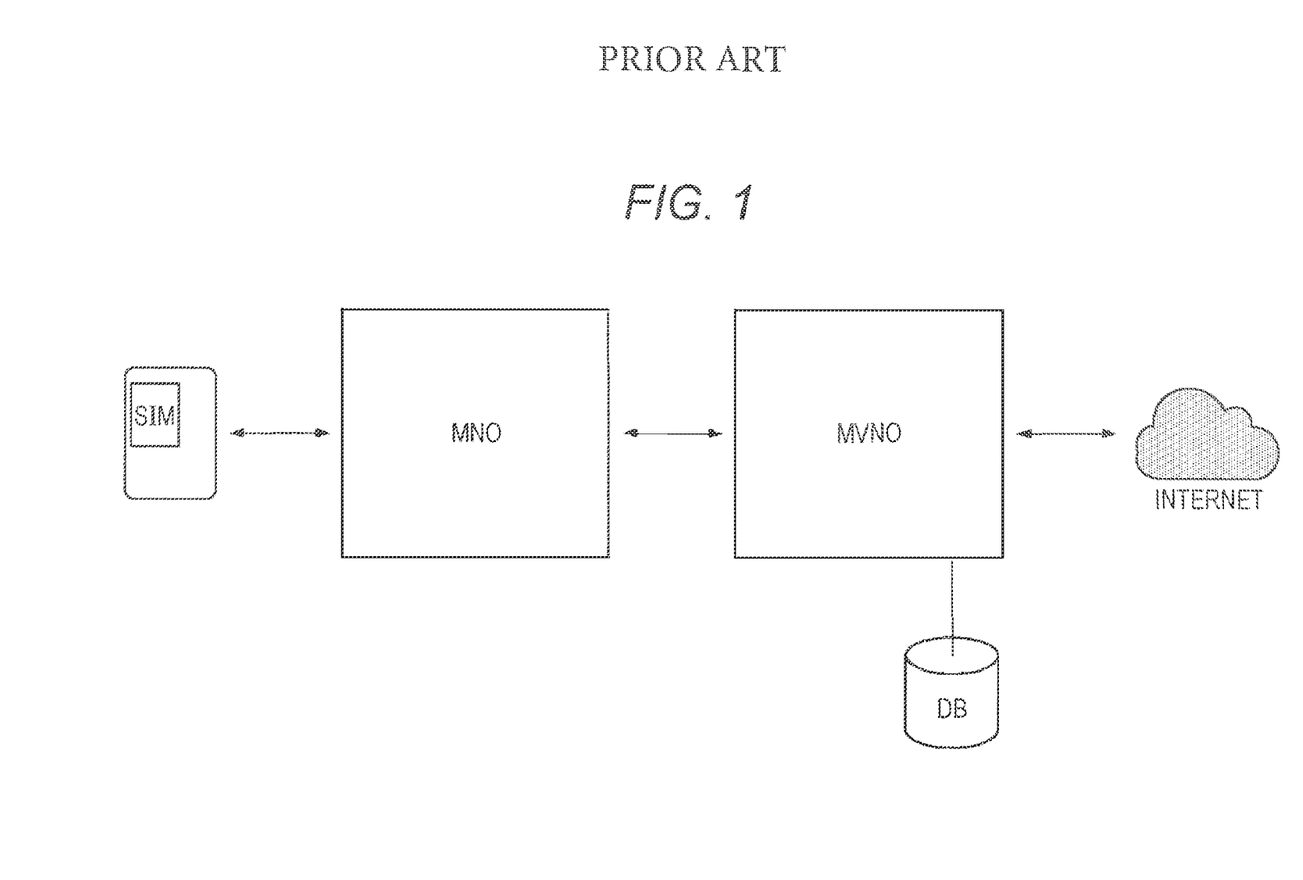
FIG. 1 is a diagram schematically illustrating an MVNO that connects its own communication infrastructure to a communication infrastructure of an MNO to provide a wireless communication service.

The MVNOs can be roughly classified into a form in which the MVNO does not have any communication infrastructure at its own company, and a form in which the MVNO has its own communication infrastructure and connects the communication infrastructure to the communication infrastructure of an MNO to provide a wireless communication service (see FIG. 1). In comparison with the former case, the latter case has the communication infrastructure in its own company, and thus can set the price according to the communication quality such as communication speed, communication capacity, and the like, and attempts to meet various needs. For example, SIM cards for wireless communication services, prices for which are suppressed by setting the maximum communication capacity that enables high-speed data communication, are sold at mass retailers.

To be specific, such an MVNO receives a SIM card from an MNO and further provides the SIM card to the end user. The MVNO manages the communication quality such as the speed limit and the capacity limit set for each SIM card together with an identification number of each SIM card in a database, and provides a wireless communication service according to contract content of a mobile terminal such as a smartphone or a tablet that has requested an access to the Internet.

In some cases, a mobile virtual network enabler (MVNE) that provides a support service for the MVNO to carry out smooth business intervenes between the MNO and the MVNO, and the MVNE may receive a SIM card from the MNO and further provides the SIM card to the MVNO.

In a case where the MVNO or the MVNE holds a gateway (GGSN in 3G or P-GW in LTE) that is an end point of a core network, as its own communication infrastructure, L2 connection (full MVNO connection (an S5/S8 interface in LTE or a Gn interface in 3G)) becomes available with the communication infrastructure (3G SGSN or LTE S-GW) of the MNO, and an L2 tunnel is formed between a wireless terminal equipped with the end user's SIM card and the gateway. The L2 connection has attracted attention because it provides a higher degree of freedom of designing wireless communication services than L3 connection (light MVNO connection).

SUMMARY OF THE INVENTION

The gateway that needs to be held by the MVNO or the MVNE for the L2 connection is expensive hardware that costs hundreds of millions of yen per unit, and the number of simultaneously connectable devices is valued as its performance. If additional data processing is performed in the gateway to meet various needs, the processing inevitably leads to reduction in the number of simultaneously connectable devices due to a physical limitation of a server on which the gateway is implemented.

The number of gateways connectable with the communication infrastructure of the MNO by the MVNO or the MVNE is determined in advance by the MNO. Mostly, a limit is put on the number of devices. Even if the cost is ignored, an increase in the number of simultaneously connectable devices by adding a larger number of hardware than the number limit is not acceptable.

For example, what has been remarkably increasing in recent years as the need for wireless communication services is the movement of IoT to add a wireless communication function to everything to enable them to be connected with the Internet. Hereinafter, a wireless device connectable to a computer network including the Internet is referred to as "IoT device". Examples of the IoT device include mobile terminals such as smart phones and tablets held by humans, and are also spreading into devices that require communication in a different form from humans, such as moving means such as automobiles, which move faster than humans, and sensors that do not move from a specific position. With the spread, the required communication speed and the required frequency of communication are diversified. In a case of incorporating an SIM card into an industrial machine to make the industrial machine be an IoT device, and causing the industrial machine to remotely communicate with another device, even if the IoT devices only perform low-capacity communication at a low frequency, a large number of simultaneous connection is required in consideration of the fact that countless devices perform communication. To meet such needs, a high-value added wireless communication service without suppressing an increase in the number of simultaneously connectable devices needs to be realized.

Similar problems may occur in a gateway L3-connected with a wireless terminal of an end user. Also, as for the gateway held by the MNO, similar problems may occur.

Furthermore, even if additional data processing is not performed in the gateway, the number of simultaneously connectable devices is limited by tunneling processing of a GTP header, and such a load of the data processing impedes realization of an increase in the number of simultaneously connectable devices.

The present invention has been made in view of such a problem, and an object of the present invention is to enable an increase in the number of simultaneously connectable devices as compared with conventional cases in a communication system and a communication method for providing an access to an IP network to a wireless terminal.

In one embodiment, a communication system is disclosed for providing an access to an Internet Protocol (IP) network to a wireless terminal, the communication system comprising: a gateway configured to pass data from the wireless terminal to the IP network and comprising a first group of servers and a second group of servers, wherein the first group of servers includes a plurality of servers and the second group of servers includes a plurality of servers, wherein the first group of servers is configured to: receive data from the wireless terminal, select one of a plurality of destination addresses as a selected destination address for the received data, and forward the data to a server of the second group of servers corresponding to the selected destination address; and wherein the server of the second group of servers is configured to: perform data processing of the forwarded data, the data processing including modification of a part of a General Packet Radio Service (GPRS) tunneling protocol (GTP) payload of the forwarded data, and output the processed data to the IP network.

Another aspect of the present invention is a communication system for providing an access to an IP network to a wireless terminal, including a gateway for passing data from the wireless terminal to the IP network, wherein the gateway includes a first group of servers with a receiving unit for receiving data from the wireless terminal, a selecting unit for selecting one of a plurality of destination addresses based on a header of the received data, and a forwarding unit for forwarding the data to the destination address selected by the selecting unit, wherein each of the first group of servers forwards the data to a server constituting a second group of servers corresponding to one of the plurality of destination addresses.

Further, according to a second aspect of the present invention, in the first aspect, the gateway is GGSN or P-GW.

Further, according to a third aspect of the present invention, the communication system further includes a group of C plane servers receiving a connection initiation request from the wireless terminal, wherein the processing of the first or second aspect performed by the first group of servers is triggered by the connection initiation request received by the group of C plane servers.

Further, according to a fourth aspect of the present invention, the number of servers constituting the first group of servers is equal to or less than a predetermined number.

Further, according to a fifth aspect of the present invention, the predetermined number is determined by an MNO.

Further, in a sixth aspect of the present invention, the number of servers constituting the second group of servers exceeds the number of servers constituting the first group of servers.

Further, according to a seventh aspect of the present invention, the first group of servers and the second group of servers respectively have a correspondence table between a destination address that was designated by the header and the plurality of destination addresses for each tunnel established by the wireless terminal.

Further, according to an eighth aspect of the present invention, the correspondence table is associated with an identifier of a GTP header within the header.

Further, according to a ninth aspect of the present invention, the selecting unit specifies one of a plurality of destination addresses to which the data is forwarded by rewriting a destination address designated by the header.

Further, according to a tenth aspect of the present invention, the plurality of destination addresses is determined so as not to allocate the same address.

Further, according to an eleventh aspect of the present invention, at least part of the plurality of destination addresses are the same.

Further, according to a twelfth aspect of the present invention, an L2 tunnel is formed as a communication channel between the wireless terminal and the first group of servers.

Further, according to a thirteenth aspect of the present invention, each server constituting the second group of servers is an instance on a cloud.

Further, according to a fourteenth aspect of the present invention, each server constituting the first group of servers is an instance on a cloud.

Further, according to a fifteenth aspect of the present invention, the second group of servers is shared by each server of the first group of servers.

Further, according to a sixteenth aspect of the present invention, a third group of servers connected to the second group of servers is included, and the third group of servers controls the number of servers constituting the second group of servers.

Further, according to a seventeenth aspect of the present invention, the third group of servers is constituted by instances constituting the second group of servers.

Further, according to an eighteenth aspect of the present invention, the number of instances constituting the second group of servers is reducible to zero depending on a processing load of the second group of servers.

Further, according to a nineteenth aspect of the present invention, the gateway is multi-tenant.

Further, according to a twentieth aspect of the present invention, the second group of servers performs data processing to the data.

Further, according to a twenty-first aspect of the present invention, the data processing is at least one of encryption of payload of the data, protocol conversion of the data, throughput control of data transmission from the wireless terminal and credential addition to payload of the data.

Further, according to a twenty-second aspect of the present invention, the second group of servers perform downstream data processing to data transmitted from the gateway to the wireless terminal.

Further, according to a twenty-third aspect of the present invention, the downstream data processing is at least one of resolution conversion of an image or a video included in the data, throughput control of data reception by the wireless terminal, priority control of data reception by the wireless terminal and execution of a function compliant with HTML5.

According to a twenty-fourth disclosed embodiment, a method is disclosed for providing an access to an Internet Protocol (IP) network to a wireless terminal, the method comprising: providing a gateway comprising a first group of servers and a second group of servers, wherein the first group of servers includes a plurality of servers and the second group of servers includes a plurality of servers; receiving, by the first group of servers, data from the wireless terminal; selecting, by the first group of servers, one of a plurality of destination addresses as a selected destination address for the received data; forwarding the data, by the first group of servers, to a server of the second group of servers corresponding to the selected destination address; performing data processing of the forwarded data by the server of the second group of servers, wherein the data processing includes modifying a part of a General Packet Radio Service (GPRS) tunneling protocol (GTP) payload of the forwarded data, and outputting the processed data to the IP network by the server of the second group of servers.

Further, according to a twenty-fifth aspect of the present invention is a program for having a gateway for passing data from a wireless terminal to an IP network to perform a communication method for providing an access to the IP network to the wireless terminal, the communication method including steps of: a first group of servers of the gateway receiving data from the wireless terminal at the gateway, the first group of servers selecting one of a plurality of destination addresses based on a header of the received data, and the first group of servers forwarding the data to the selected destination address, wherein each of the first group of servers forwards the data to a server constituting a second group of servers corresponding to one of the plurality of destination addresses.

Advantageous Effect of Invention

According to an aspect of the present invention, in a gateway for passing data from a wireless terminal to an IP network, a first group of servers, which receives the data from the wireless terminal, and a second group of servers, which performs additional data processing or data processing not performed in the first group of servers, are isolated, whereby data processing using a larger amount of computing resources can be performed in the second group of servers while an upper limit of the number of simultaneously connectable devices of the first group of servers is increased.

DETAILED DESCRIPTION OF THE DRAWINGS

Hereinafter, embodiments of the present invention will be described with reference to the drawings.

In the present specification, a case in which an MVNO holds a gateway will be described as an example. However, it is noted that the present invention is also applicable to a case in which an MVNE or an MNO holds the gateway.

The terms MNO, MVNE, and MVNO may be different in their definition depending on the country. Hereinafter, description will be given using an example, in which, as in Japan, an MNO holds 3G SGSN and LTE S-GW as communication infrastructures, and an MVNO holds 3G GGSN and LTE P-GW as communication infrastructures. In any case, applicability of the present invention is unchanged, which enables an increase in the number of simultaneously connectable devices even under gateways having restrictions on the number of installable devices.

(Outline of Present Invention)

Figure 2:
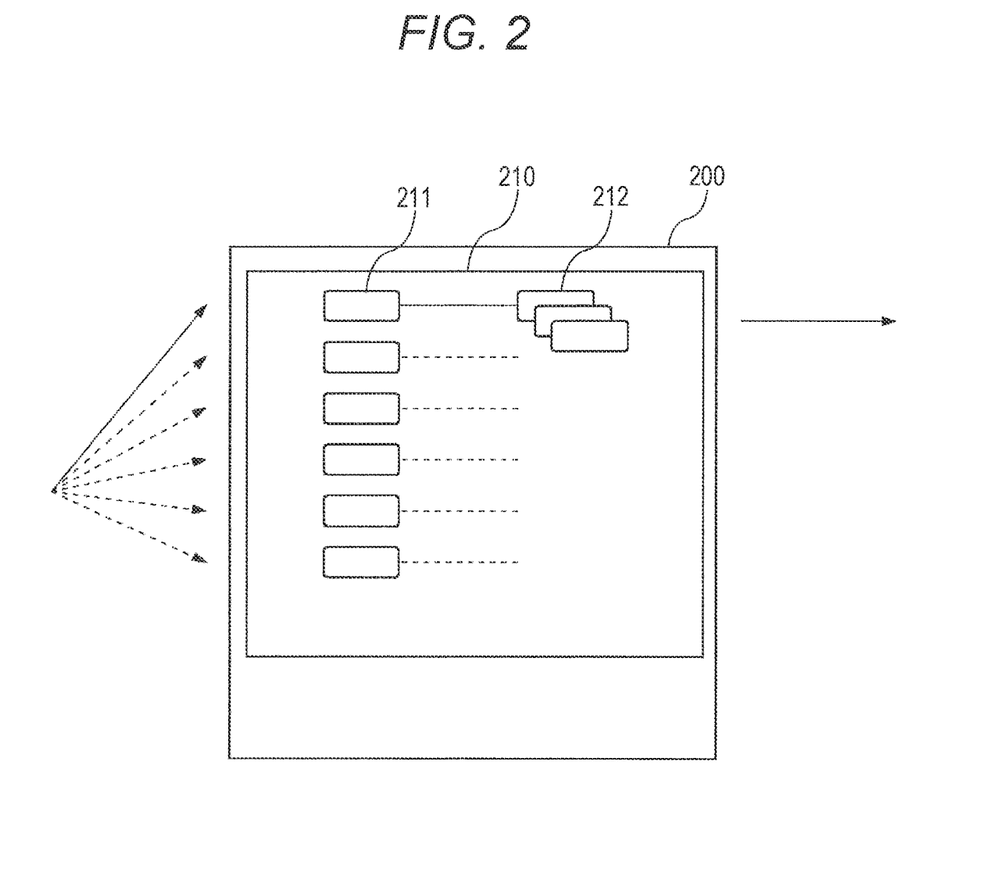
FIG. 2 is a diagram illustrating an outline of a communication system including a gateway according to an embodiment of the present invention.

FIG. 2 illustrates an outline of a communication system including a gateway according to the present invention.

A communication system 200 according to the present invention is a communication system for providing an access to an IP network or the like to a wireless terminal, and includes a gateway 210 for passing data from the wireless terminal to the IP network.

The gateway 210 includes a first group of servers 211. For example, the number of servers connectable with the MNO's communication infrastructure (core network) is limited, which is typically defined by the MNO and cannot be exceed. For example, IP addresses of the servers constituting the first group of servers 211 are registered in advance in a database of the MNO, and the MNO determines to which of the servers of the first group of servers 211 the data from the wireless terminal is transmitted by reference to a list of the registered IP addresses. For example, allocation is made according to the round robin method. The registered information may include a destination address for identifying a destination such as a MAC address, in addition to the IP addresses.

Each of the servers constituting the first group of servers 211 includes a receiving unit that receives data from the wireless terminal, a selecting unit that selects any one of a plurality of destination addresses on the basis of a header of the received data, and a forwarding unit that forwards the received data to the destination address selected by the selecting unit.

Figure 3:
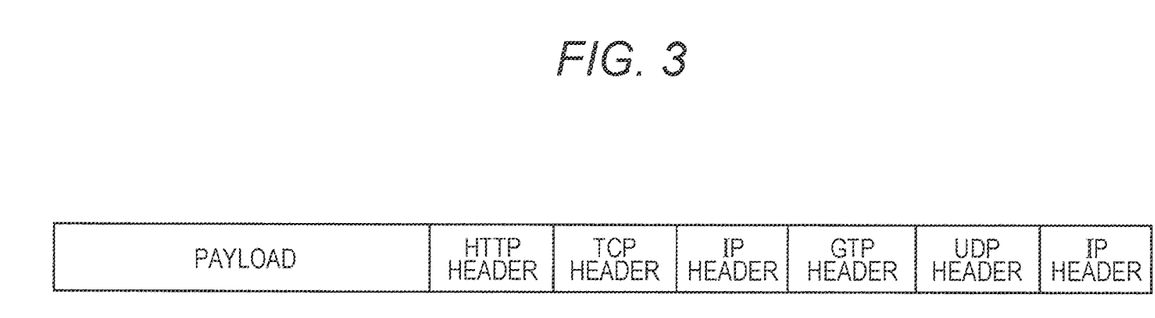
FIG. 3 is a diagram exemplarily illustrating a packet transmitted from a wireless terminal to a gateway.

In an embodiment of the present invention, the forwarding unit rewrites the IP address designated by the header of the data received from the wireless terminal with one of the plurality of IP addresses. As illustrated in FIG. 3, the data includes a payload and a header. In FIG. 3, a part higher than an HTTP layer is illustrated as the payload. However, focusing on a GTP header, a part higher than the GTP layer (left side in FIG. 3) can be seen as the payload, in this case, a GTP payload.

Figure 4:
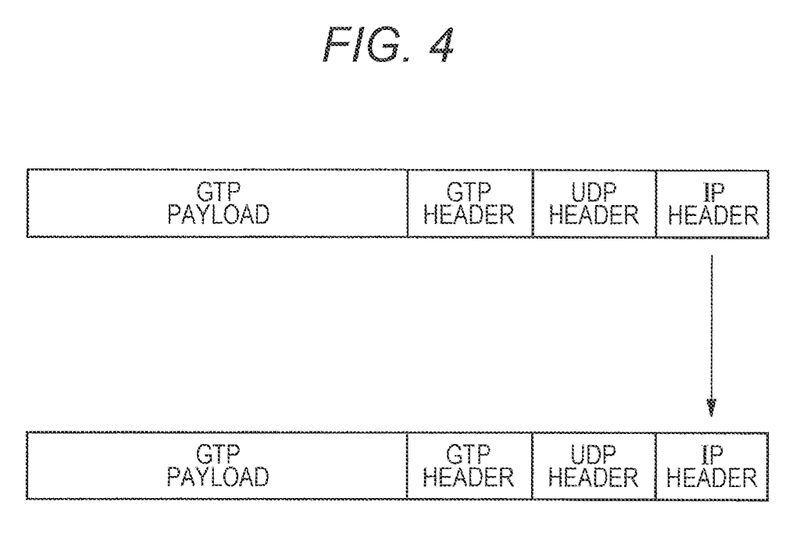
FIG. 4 is a diagram illustrating rewriting of a GTP header in an embodiment of the present invention.

As illustrated in FIG. 4, rewriting can be performed by rewriting the IP address designated by an IP header in the header. To be specific, the first group of servers 211 determines an identification number of a SIM card such as IMSI or ICCID from an identifier (TEID) in the GTP header included in an IP packet that has arrived, to identify which wireless terminal the data is from, and can rewrite the IP address with an IP address of one of servers of a second group of servers 212 associated with the identifier.

Further, rewriting is an example of processing necessary for forwarding data received by each server of the first group of servers 211 to a server configuring the second group of servers 212, and other tunneling (IPIP, GRE, IPsec, GTP, or the like) can be performed to transfer the data.

The selecting unit can determine the plurality of IP addresses corresponding to the second group of servers 212 at the destination, from a private IP address or global IP address space such that the same IP address is not allocated to the plurality of servers of the second group of servers 212 at the same time. Further, the selecting unit can allocate at least parts of the plurality of IP addresses to the plurality of servers at the same time as the same IP address. In this case, one of the servers to which the same IP address has been allocated is made active and the other servers are set to stand by. Further, a part of the IP addresses can be made accessible only for a specific identifier (TEID) according to contract content. Further, each of the first group of servers 211 and the second group of servers 212 can hold a correspondence table between the IP address before rewriting, which has been designated by the header, and the plurality of IP addresses after rewriting, for each L2 or L3 tunnel. Each correspondence table can be associated with each wireless terminal by the identifier in the GTP header or the like. Further, only the second group of servers 212 may have the correspondence table, and the first group of servers 211 may inquire of the second group of servers 212.

Here, as an operation of the gateway 210, the description is made mainly assuming a case in which communication is performed on a U plane of GTP for an access to the IP network after an L2 tunnel is formed as a communication channel between the gateway 210 and a mobile terminal. However, rewriting of the IP address can be similarly performed in a case where communication is performed on a C plane of GTP to form the L2 tunnel. Further, rewriting is also applicable to a case where a tunnel such as an L3 tunnel is formed, other than the L2 tunnel.

In the above example of the present invention, the gateway 210 is isolated into the first group of servers 211, which is the part connected with the MNO's communication infrastructure, and the second group of servers 212, which is the part that performs additional data processing and the like, whereby occupation of computing resources that limits the increase in the number of simultaneously connectable devices of the gateway 210 is avoided even if the additional data processing in the gateway 210 is added, and implementation of rich functions and complicated functions to the gateway 210 becomes possible.

Further, even if the additional data processing is not added, for example, the first group of servers 211 substantially performs only the rewriting of the IP address designated by the header of the received data with one of the plurality of IP addresses to limit the data processing in the first group of servers 211, so that the limited computing resources in the first group of servers 211 are mainly used for forwarding to the second group of servers 212 that does not have such a limit and the number of simultaneously connectable devices can be improved under the number limit of the gateways connectable with the MNO's communication infrastructure. As an example, tunneling processing of the GTP header may be performed in the second group of servers 212.

Further, for example, the main reason for the communication restriction during New Year's Holiday or in the new year is an excess in one of design capacity of a CPU, a memory, a storage, and network traffic of the server that processes the communication. According to the present embodiment, the IP address of the server with a low load is allocated on the basis of metrics of the processing capability of the second group of servers 212, or the processing is distributed by newly activating a server when the capacity of the second group of servers 212 as a whole is insufficient, whereby the number of simultaneously connectable devices and the capacity of the communication system as a whole can be increased.

In particular, each server constituting the second group of servers 212 can be an instance on a cloud, and by doing so, the number of the instances can be increased as needed to scale out, and the computing resources can be virtually inexhaustibly used.

In this specification, the term "cloud" refers to a system capable of dynamically provisioning and providing computing resources such as a CPU, a memory, a storage, and a network bandwidth according to demand on a network. For example, the cloud can be used by AWS or the like.

Further, each server constituting the first group of servers 211 can be an instance on the cloud, and by doing so, the IP address of each server can be virtualized to improve fault tolerance. The correspondence between the first group of servers 211 and the second group of servers 212 can be held on a database of a third group of servers 500 described below in a latest state in real time, for example. Even if a certain server goes down, the fault can be instantaneously recovered by attaching the IP address to another server. In addition, scaling up and scaling down can be freely performed by using cloud. Therefore, an instance having optimum CPU, memory, storage, and network bandwidth can be selected according to a processing load. As a result, there is no need to prepare hardware that meets the maximum demand at peak hour on a constant basis, and cost optimization becomes possible. This also applies to the utilization of cloud for the second group of servers 212.

An example of the IP network accessed by the wireless terminal, which is enabled by the present embodiment, includes a private system besides the Internet. In a case of realizing at least part of an on-premise private system and the gateway 210 on cloud, a different IP network on the same cloud or an IP network on a different cloud are included in the private system for example, and the communication system 200 or the gateway 210 can be connected with the private system by a dedicated line or a virtual dedicated line.

(Control of Second Group of Servers)

Figure 5:
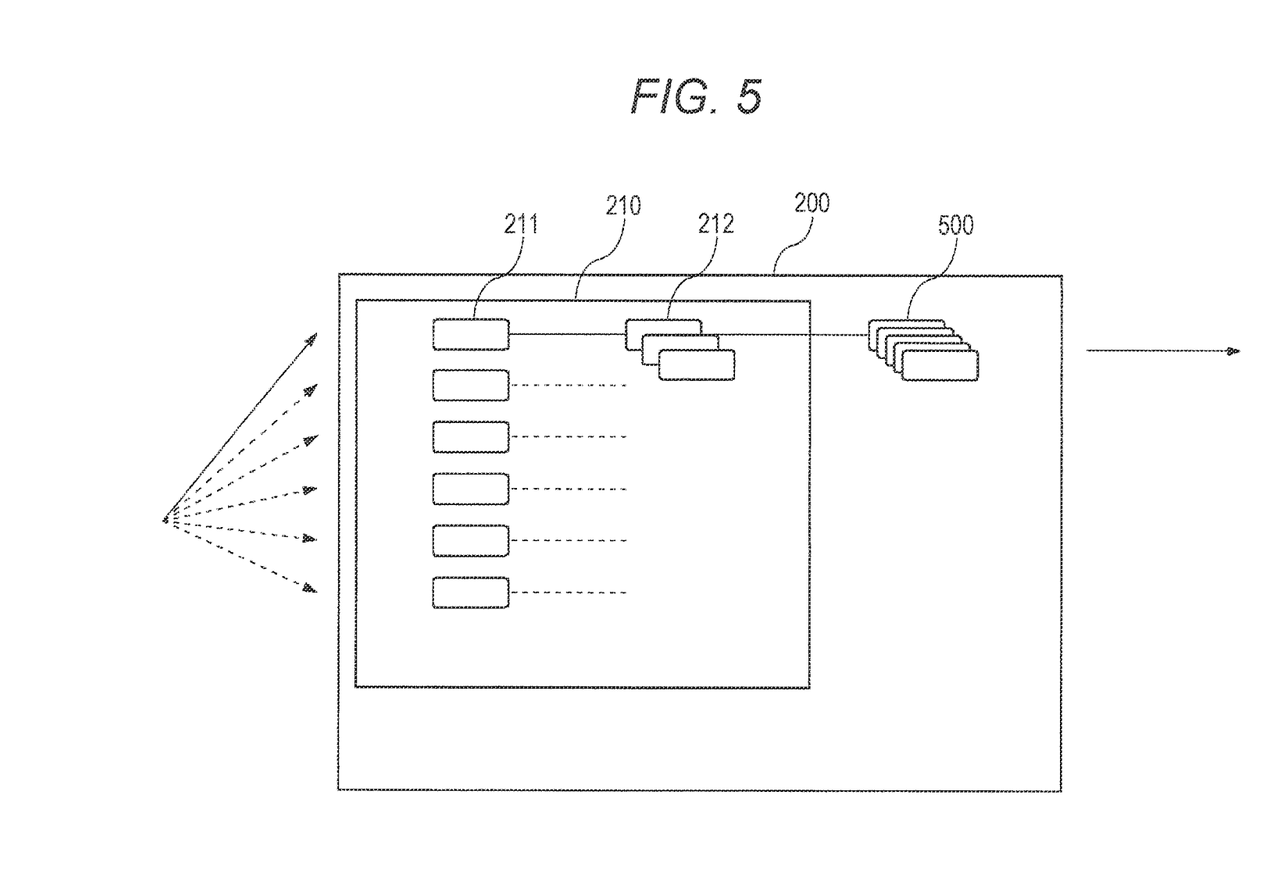
FIG. 5 is a diagram illustrating an outline of a communication system including a gateway according to another embodiment of the present invention.

In an embodiment of the present invention, as illustrated in FIG. 5, the communication system 200 further includes the third group of servers 500, and controls the number of servers constituting the second group of servers 212 on the basis of the metrics of the processing capability to scale in or scale out the second group of servers 212. The third group of servers 500 monitors the metrics of the processing capacities of the instances used in the first group of servers 211 and the second group of servers 212, and can allocate connection to an instance with a low processing load every time a connection request is given from the wireless terminal.

Examples of the metrics to be monitored include a CPU load, a memory utilization rate, disk read, disk write, a network traffic reception amount, and a network traffic transmission amount.

Figure 6:
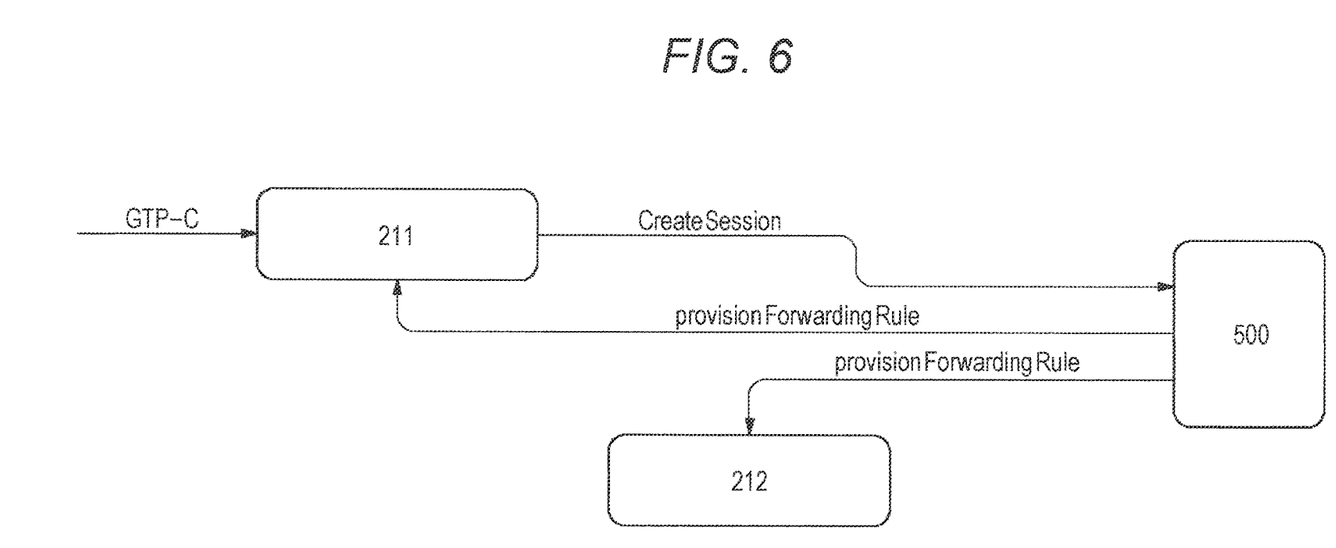
FIG. 6 is a diagram illustrating an example of a determination process of correspondence between a first group of servers and a second group of servers.

In addition, the correspondence between the first group of servers 211 and the second group of servers 212 can be selected using the third group of servers 500. As illustrated in FIG. 6, when the first group of servers 211 receives a GTP connection initiation request (GTP-C) including IMSI, TEID, and the like of the wireless terminal, the first group of servers 211 transmits a CreateSession message to the third group of servers 500, and the third group of servers 500 that has received the message can select the second group of servers 212 at the destination on the basis of the metrics of the processing capacity created by continuously or intermittently monitoring use statuses of the CPU, the memory, the storage, the network traffic, and the like of the computing resources of the second group of servers 212. At the time of the GTP connection initiation request, correspondence among the identifier of the L2 tunnel, the identification number of the wireless terminal, the IP addresses of the first group of servers 211, and the IP addresses of the second group of servers 212 is recorded in the third group of servers 500, whereby a session of the L2 tunnel can be recovered at the time of the fault of the first group of servers 211 or the second group of servers 212.

In FIG. 6, the first group of servers 211 has received the connection initiation request and the first group of servers 211 serves the function on the C plane. However, a group of C plane servers that serves a function on the C plane can be separately provided as a part of the gateway 210 or a part of the communication system 200. In doing so, the computing resources of the first group of servers 211 can be used for simultaneous connection with a larger number of devices. In this case, the first group of servers 211 does not receive the connection initiation request and has no function on the C plane.

Further, the third group of servers 500 can send a provisioning message to a server with a less use status and a small performance metric at the time of the GTP connection initiation in the second group of servers 212, thereby to select the server with a small processing load from the second group of servers 212 and allocate a GTP connection destination server.

Figure 7:
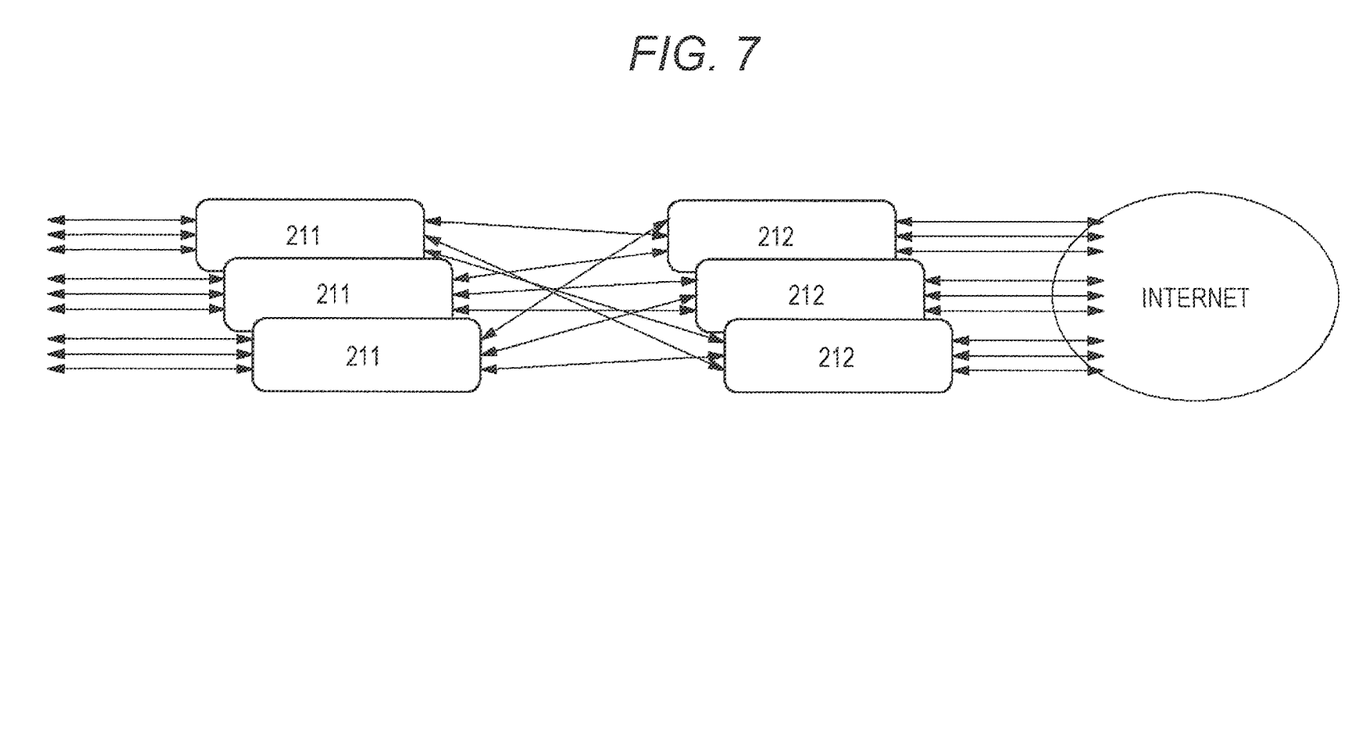
FIG. 7 is a diagram illustrating an example of correspondence between a first group of servers and a second group of servers.

Then, as illustrated in FIG. 7, a server constituting the first group of servers 211 forwards the data from the wireless terminal to one of the second group of servers 212 corresponding to the plurality of IP addresses after rewriting. FIG. 7 illustrates that each of the first group of servers 211 and the second group of servers 212 includes three instances, and the second group of servers 212 is shared by the servers of the first group of servers 211. However, an embodiment is not limited to the example.

The number of the servers constituting the second group of servers 212 favorably exceeds the number of the servers constituting the first group of servers 211. If the number of the servers constituting the second group of servers 212 is equal to or less than the number of the servers constituting the first group of servers 211, resources such as the number of sessions, the number of IP flows, and the like, which are determined by the number of servers or instances, are not increased, and thus sufficient scalability may not be able to be exhibited.

When the processing load of the instance group as a whole of the second group of servers 212 exceeds a set level, a new instance can be activated and a server can be added. On the other hand, when the processing load of the instance group as a whole of the second group of servers 212 falls below the set level, one of active instances is selected, and if there is an L2 tunnel or the like in communication, it can be transferred to another instance, and then the selected instance can be stopped. For example, the number of instances constituting the second group of servers 212 can be reduced to zero.

The third group of servers 500 can set the number of instances by which the second group of servers 212 is scaled in or scaled out, according to a predetermined schedule. For example, the number of instances is automatically increased from 11:30 just before the lunch break time when communication demand comes to a peak, and the number of instances is automatically decreased at 13:30 at off-peak time.

Note that, in the above example, the third group of servers 500 is provided outside the gateway 210. However, the gateway 210 may include the third group of servers 500, and the instances constituting the second group of servers 212 can constitute the third group of servers.

Further, the third group of servers 500 can include a common database and can perform processing in parallel in a plurality of instances.

(Additional Data Processing)

Specific examples of additional data processing available in the gateway 210 by the present invention will be described.

Encryption

Figure 8:
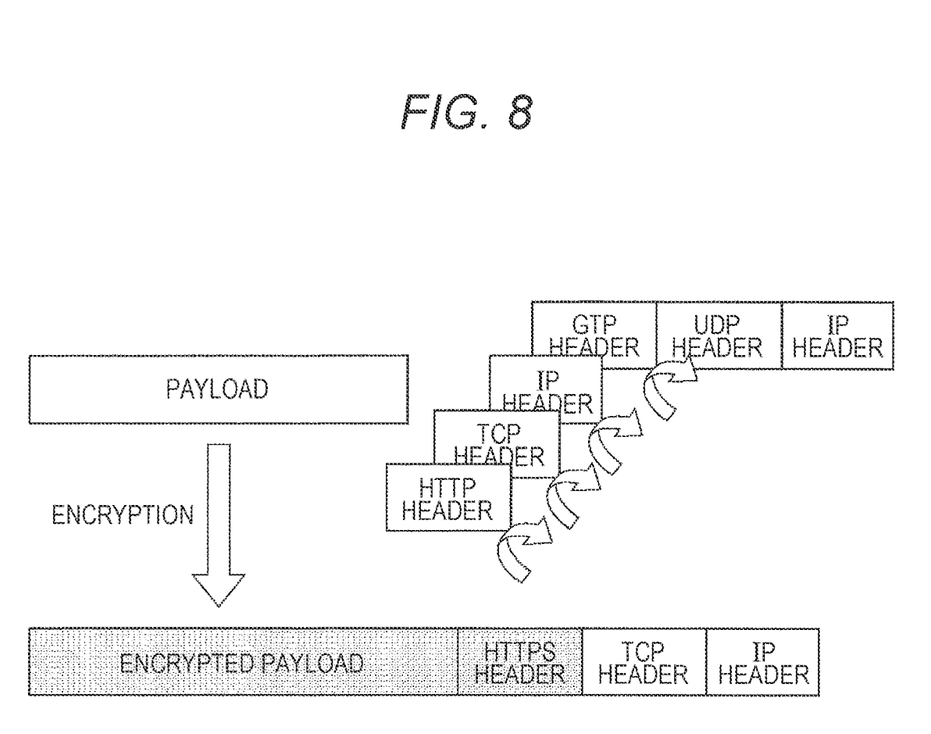
FIG. 8 is a diagram illustrating additional data processing for a payload according to an embodiment of the present invention.

Data processing for payload encryption will be described with reference to FIG. 8. The corresponding server of the second group of servers 212, which has received the payload to which the headers are added from the first group of servers 211, first removes all the headers. Then, after encrypting a payload part of HTTP (HTTP payload), the server newly adds an HTTPS header and further reassigns the TCP/IP headers again.

With such data processing, encryption of the payload is performed on behalf of the wireless terminal without applying a load to the first group of servers 211 and so to say assumed by the server, and security of communication can be enhanced. Especially, the communication system (communication platform) side can add required added value even a wireless terminal such as an IoT device with relatively low performance is used.

Note that, in the illustrated example, the payload part of TCP (TCP payload) is encrypted. However, the payload part of IP (IP payload) can be encrypted. In this case, the IP header included in the GTP payload may be removed once and the IP payload may be encrypted.

Credential Addition

The corresponding server in the second group of servers 212, which has received the payload to which the headers are added from the first group of servers 211, can identify the identifier included in the GTP header in the process of removing the headers, thereby to specify subscriber information such as the identification number of the wireless terminal or the like. Therefore, for example, credentials such as a password accompanying the subscriber information recorded in the database of the third group of servers 500 can be obtained. The second group of servers 212 can capture communication addressed to a specific HTTP server from the wireless terminal, generate a signature with credentials necessary for the HTTP server, and then transmit the data by HTTPS. The term "credentials" used here is a generic term for information used for user authentication, including an ID and a password.

With such data processing, even the wireless terminal such as the IoT device that is powerless and has insufficient storage capacity can perform communication with a server on the Internet by adding the credentials such as the password.

Proxy Storage

The first group of servers 211 receives data according to protocols such as HTTP, MQTT, TELNET, FTP, and TCP transmitted from the wireless terminal. The corresponding server of the second group of servers 212, which has received the payload to which the header is added from the first group of servers 211, first removes all the headers. Then, the credentials necessary for storing data in a computing storage on a cloud or transfer data described by a data description language such as JSON is added, then the HTTP header is reassigned or the HTTPS header is newly added after encrypting the HTTP payload part, and the data in the payload can be stored in the computing storage or a database on the cloud.

With such data processing, even the wireless terminal such as the IoT device that is powerless and has insufficient storage capacity can easily store data only by being provided with a communication function.

Protocol Conversion

Figure 9:
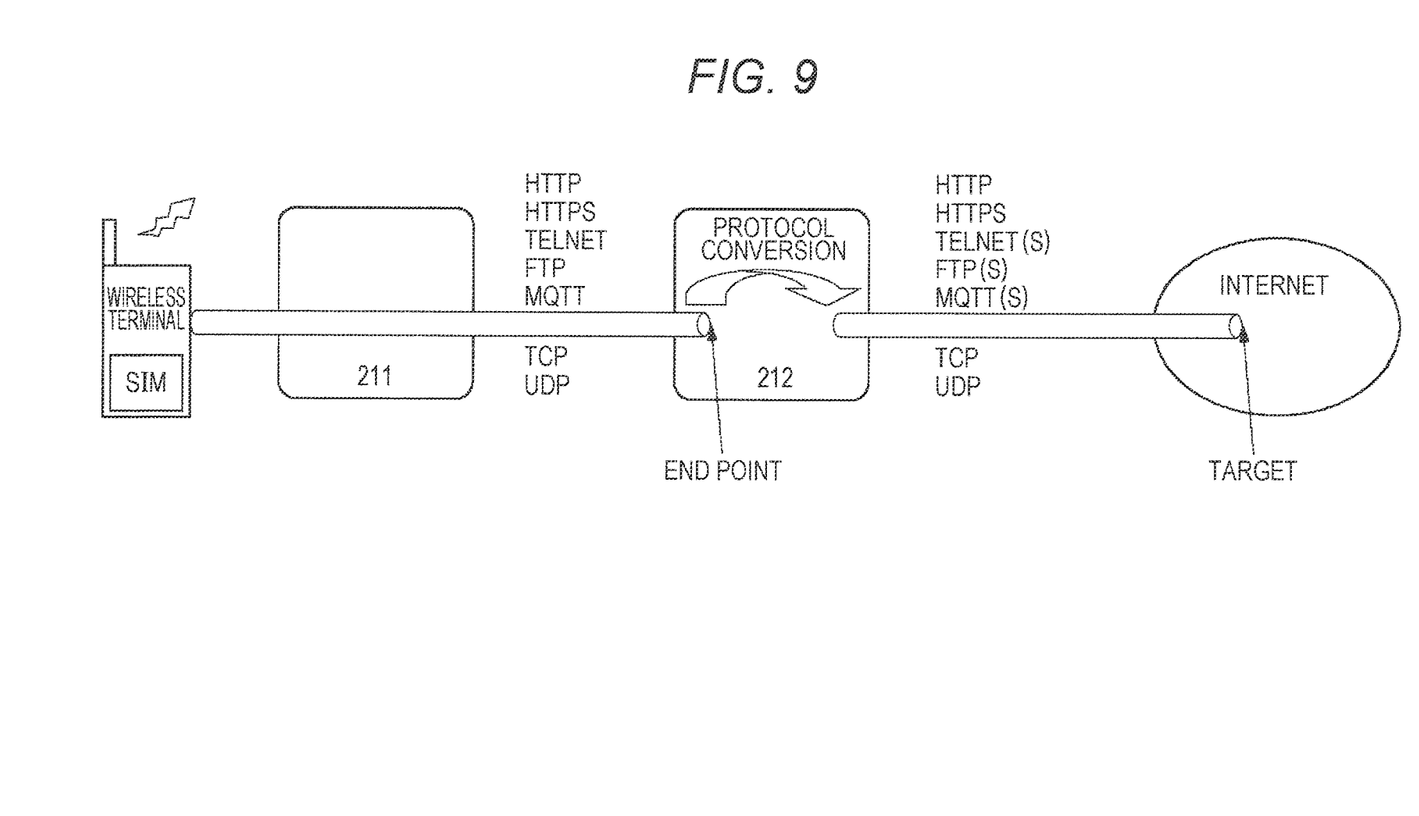
FIG. 9 is a diagram illustrating a flow of data processing of protocol conversion in an embodiment of the present invention.

A flow of data processing of protocol conversion will be described with reference to FIG. 9. An instance of the second group of servers 212, which has received, via the first group of servers 211, data transmitted from the wireless terminal toward the end point and carried by protocols such as HTTP, HTTPS, MQTT, TELNET, FTP, TCP, and the like, can discriminate the subscriber information of the wireless terminal that is the transmission source by identifying the identifier included in the GTP header when once removing all the headers. The transmission source IP address in the IP header is replaced such that the IP address of the instance itself becomes a recipient of communication with an outside, and then information such as a password corresponding to the subscriber information is obtained from the database of the third group of servers 500, for example, and the credentials such as an ID and the password included in the subscriber information of the wireless terminal are added, then headers of other protocols (HTTP, HTTPS, MQTT, TELNET, FTP, TCP, IP, and the like) that are different from those when transmitted from the wireless terminal are reassigned, the payload part is encrypted or non-encrypted and can be transmitted to an arbitrary server (target) on the Internet.

With such additional data processing, even if the wireless terminal such as an IoT device has a powerless processing capacity and a certain protocol is difficult to have, the second group of servers 212 can serve a relay function to conduct the protocol conversion to perform communication under the protocol with a server on the Internet side.

Throughput Control

By measuring a data amount transmitted and received between the wireless terminal and the IP network by the second group of servers 212, the data traffic per unit time can be controlled. When a transmitted data amount from the wireless terminal or a received data amount exceeds a limiting value, the second group of servers 212 discards the IP packet or buffers the IP packet for a fixed time, thereby to control a data flow rate. As a result, throughput control becomes possible.

With such data processing, data can be transmitted to a large number of IoT devices with a limited reception capacity by appropriate throughput control without giving a load to the first group of servers 211.

Total Data Traffic Control

By measuring the data amount transmitted and received between the wireless terminal and the IP network by the second group of servers 212, transmitting the data amount to the third group of servers 500, and controlling transmission/reception traffic of individual wireless terminal in the database of the third group of servers 500, the total data traffic can be controlled. Correspondence between the wireless terminal and the second group of servers 212 can be determined as described above when the GTP is connected, and thus the total data traffic passing the second group of servers 212 cannot be measured by only a specific server. However, by accumulating the data amount in real time in the third group of servers 500, transmission or reception data communication from or to the wireless terminal can be stopped or throughput can be controlled to have a flow rate of a fixed value or less when the data amount transmitted or received by the specific wireless terminal exceeds a set value within a fixed period.

With such data processing, the total data traffic of the individual wireless terminals can be accumulated in real time by the database of the third group of servers 500 without applying a load to the first group of servers 211. Therefore, the total data traffic of a large number of wireless terminals such as IoT devices can be collectively grasped as one group.

Response and Priority Control

Processing of data to be transmitted from the Internet to a wireless terminal can be performed with given priority. For example, data destined for a SIM card with higher priority is placed in a transmission queue of a higher priority instance within transmission queues of the second group of servers 212, other data of a SIM card with low priority is placed in a transmission queue of a low priority instance, and priority transmission processing according to priority is performed by performing processing first from the data in the transmission queue with higher priority, whereby response performance can be controlled. Alternatively, by discarding the data to a SIM card with lower priority by the second group of servers 212, data to a SIM card with higher priority can be preferentially processed, and the response can be improved.

With such data processing, an IoT device for which emergency notification is required can be given higher priority, and can perform data communication with short response.

Time Zone Restriction

The corresponding server of the second group of servers 212, which has received the payload to which the headers are added from the first group of servers 211, determines data communication from a specific wireless terminal and can stop the data communication depending on a time zone, or control the throughput to have a flow rate of a fixed value or less. For example, in a case of a wireless terminal permitted to communicate only during a late night time period, a new request is not accepted by the first group of servers 211 except the permitted time or the communication processing can be stopped by the second group of servers 212 if a communication path has already been established.

With such data processing, data from an IoT device can be stopped when the wireless data communication comes to a peak, and conversely, the time zone during which the wireless data communication is off-peak can be effectively used.

Notifications and Program Execution

The first group of servers 211 receives data by a protocol such as HTTP, MQTT, TELNET, FTP, and TCP transmitted from a wireless terminal. The corresponding server of the second group of servers 212, which has received the payload to which the headers are added from the first group of servers 211, first removes all the headers. Then, an SMS or an e-mail is sent and notified to the destination on the basis of the information stored in the third group of servers 500, or the payload is input to a program prepared in advance and a specific program is executed.

With such data processing, when a specific event such as a fault occurs, processing of notifying the event by e-mail or automatically executing a determined program can be easily realized.

Resolution Conversion of Image/Video

To reduce a CPU processing load of a wireless terminal, resolution of an image or a video included in downlink data transmitted from the gateway 210 to the wireless terminal can be changed. The second group of servers 212 can determine the throughput by measuring the data transmission amount per unit time for individual wireless terminal. When the throughput falls below a fixed value or less, the second group of servers 212 extracts image/video data included in transmission data and converts the image/video data into a bit rate of codec conforming to currently available throughput and then can transmit the data to the wireless terminal.

With such data processing, the image or the video can be transmitted without transmission delay to an IoT device that requires real-time properties such as a surveillance camera.

Thin Client

While applications conforming to HTML 5 are increasing for mobile terminals such as smartphones and tablets, execution of such applications can be performed on the second group of servers 212, not on the web browser of the mobile terminal, and only screen display can be performed on the mobile terminal side.

To be specific, the gateway 210 side can serve, on behalf of the mobile terminal, a networking function (HTTP or HTTPS), an image or video data compression function (optimize and reduce the data for a screen size of the mobile terminal), an image or video codec conversion function, a DRM addition/conversion function, an interpreter (or compiler) function of Javascript (registered trademark), a data caching function (with a function to predict a page to be read next by a user), a rendering function (with the function to predict a page to be read next by a user), a data storage function, and the like.

The mobile terminal side may just serve a function as a display device as a limiting case, and necessary functions of an application can be performed by the communication system (communication platform) side on behalf of the mobile terminal.

(Public Cloud)

The communication system 200 can be implemented on a cloud, and in particular can be implemented on a public cloud. Here, the "public cloud" refers to a cloud usable by a plurality of tenants.

In the public cloud, computing resources are used by a plurality of operators in different patterns, as compared with a private cloud used by a single operator. Therefore, a difference in utilization rate between at peak hour and at an average becomes small by statistical multiplexing effect. Therefore, the public cloud operators can efficiently operate large-scale computing resources. In the present invention, by sharing computing resources with operators other than the communication business on the public cloud, the computing resources necessary at peak hour can be secured without limitation from the public cloud.

REFERENCE SIGNS LIST

200 Communication system (communication platform)
210 Gateway
211 First group of servers
212 Second group of servers
500 Third group of servers

The invention claimed is:

1. A communication system for providing an access to an Internet Protocol (IP) network to a wireless terminal, the communication system comprising:
a gateway configured to pass data from the wireless terminal to the IP network and comprising a first group of servers and a second group of servers, wherein the first group of servers includes a plurality of servers and the second group of servers includes a plurality of servers,
wherein the first group of servers is configured to:
receive data from the wireless terminal,
select one of a plurality of destination addresses as a selected destination address for the received data, and
forward the data to a server of the second group of servers corresponding to the selected destination address; and
wherein the server of the second group of servers is configured to:
perform data processing of the forwarded data, the data processing including modification of a part of a General Packet Radio Service (GPRS) tunneling protocol (GTP) payload of the forwarded data, and output the processed data to the IP network.

2. The communication system according to claim 1, wherein the gateway is GGSN or P-GW.

3. The communication system according to claim 1, wherein the first group of servers does not serve a C plane function.

4. The communication system according to claim 1, wherein the number of servers constituting the second group of servers is controllable to be larger than the number of servers constituting the first group of servers.

5. The communication system according to claim 1, wherein the selected destination address specifies a destination addresses to which the data is to be forwarded, wherein the selection of the destination address includes rewriting a destination address designated by a header of the data.

6. The communication system according to claim 1, wherein a number of instances constituting the second group of servers is reducible to zero based on processing load of the second group of servers.

7. The communication system according to claim 1, wherein the second group of servers is configured to perform downstream data processing to data transmitted from the gateway to the wireless terminal.

8. The communication system according to claim 1, wherein the data processing includes:
removal of a header of the data;
identification of an identifier in the removal the header of the data;
data processing of the GTP payload of the data based on data stored in a database accessible to the second group of servers based on the identifier; and
addition of a header to the processed payload.

9. The communication system according to claim 1, wherein
the gateway is located on a cloud,
the plurality of servers included in the first group of servers are instantiated on the cloud, and
the plurality of servers included in the second group of servers are instantiated on the cloud.

10. The communication system according to claim 1, wherein
the gateway is located on a public cloud,
the plurality of servers included in the first group of servers are instantiated on the public cloud, and
the plurality of servers included in the second group of servers are instantiated on the public cloud.

11. The communication system according to claim 1, wherein the gateway is distinct from a communication infrastructure of a mobile network operator (MNO).

12. The communication system according to claim 11, wherein the first group of servers is configured to provide an interface between the communication infrastructure of the MNO and the second group of servers.

13. A method for providing an access to an Internet Protocol (IP) network to a wireless terminal, the method comprising:
- providing a gateway comprising a first group of servers and a second group of servers, wherein the first group of servers includes a plurality of servers and the second group of servers includes a plurality of servers;
- receiving, by the first group of servers, data from the wireless terminal;
- selecting, by the first group of servers, one of a plurality of destination addresses as a selected destination address for the received data;
- forwarding the data, by the first group of servers, to a server of the second group of servers corresponding to the selected destination address;
- performing data processing of the forwarded data by the server of the second group of servers, wherein the data processing includes modifying a part of a General Packet Radio Service (GPRS) tunneling protocol (GTP) payload of the forwarded data, and
- outputting the processed data to the IP network by the server of the second group of servers.

14. The method of claim 13, wherein the data processing of the forwarded data by the server of the second group of servers includes:
- removing of a header of the data;
- identifying an identifier in the removal the header of the data;
- data processing of the GTP payload of the data based on data stored in a database accessible to the second group of servers based on the identifier; and
- adding a new header to the processed payload.

15. At least one non-transitory machine-readable storage medium comprising instructions that, when executed on computing hardware, cause the computing hardware to carry out operations for providing access to an Internet Protocol (IP) network for a wireless terminal, the operations comprising:
- providing a gateway comprising a first group of servers and a second group of servers, wherein the first group of servers includes a plurality of servers and the second group of servers includes a plurality of servers;
- receiving, by the first group of servers, data from the wireless terminal;
- selecting, by the first group of servers, one of a plurality of destination addresses as a selected destination address for the received data,
- forwarding the data, by the first group of servers, to a server of the second group of servers corresponding to the selected destination address;
- performing data processing of the forwarded data by the server of the second group of servers, wherein the data processing includes modifying a part of a General Packet Radio Service (GPRS) tunneling protocol (GTP) payload of the forwarded data, and
- outputting the processed data to the IP network by the server of the second group of servers.

16. The at least one non-transitory machine-readable storage medium of claim 15, wherein the data processing of the forwarded data by the server of the second group of servers includes:
- removing of a header of the data;
- identifying an identifier in the removal the header of the data;
- data processing of the GTP payload of the data based on data stored in a database accessible to the second group of servers based on the identifier; and
- adding a new header to the processed payload.

* * * * *